(12) United States Patent
Bode et al.

(10) Patent No.: US 12,078,242 B2
(45) Date of Patent: Sep. 3, 2024

(54) SELECTOR LEVER ASSEMBLY FOR SELECTING AND SWITCHING DIFFERENT DRIVING MODES IN A VEHICLE TRANSMISSION

(71) Applicant: ZF Friedrichshafen AG, Friedrichshafen (DE)

(72) Inventors: Carsten Bode, Diepholz (DE); Jan Szekeres-Kriselius, Lemförde (DE)

(73) Assignee: SIGNATA GMBH, Diepholz (DE)

( * ) Notice: Subject to any disclaimer, the term of this patent is extended or adjusted under 35 U.S.C. 154(b) by 92 days.

(21) Appl. No.: 17/640,584

(22) PCT Filed: Aug. 26, 2020

(86) PCT No.: PCT/EP2020/073870
§ 371 (c)(1),
(2) Date: Mar. 4, 2022

(87) PCT Pub. No.: WO2021/043649
PCT Pub. Date: Mar. 11, 2021

(65) Prior Publication Data
US 2022/0333680 A1    Oct. 20, 2022

(30) Foreign Application Priority Data
Sep. 6, 2019 (DE) .......................... 102019213557.9

(51) Int. Cl.
*F16H 61/22*  (2006.01)
*F16H 59/08*  (2006.01)
*F16H 61/24*  (2006.01)

(52) U.S. Cl.
CPC ............. *F16H 59/08* (2013.01); *F16H 61/22* (2013.01); *F16H 2059/081* (2013.01); *F16H 2061/243* (2013.01)

(58) Field of Classification Search
CPC .... F16H 59/08; F16H 61/22; F16H 2059/081; F16H 2061/243
(Continued)

(56) References Cited

U.S. PATENT DOCUMENTS

| 9,810,614 B2 | 11/2017 | Saussine et al. |
| 2016/0245396 A1 | 8/2016 | Behounek et al. |

(Continued)

FOREIGN PATENT DOCUMENTS

| DE | 10 2004 041 087 A1 | 3/2006 |
| DE | 10 2005 002 086 B3 | 9/2006 |

(Continued)

OTHER PUBLICATIONS

International Search Report and Written Opinion of the International Search Authority mailed Nov. 2, 2020 in International Application No. PCT/EP2020/073870 (English and German languages) (12 pp.).

(Continued)

*Primary Examiner* — Randell J Krug
(74) *Attorney, Agent, or Firm* — Crowell & Moring LLP

(57) ABSTRACT

A selector lever assembly for selecting and shifting to various driving modes in a vehicle transmission may have a rotary switch that is rotatably mounted in a housing, where the driving modes are assigned to the rotational range and separated from one another by a latching contour in a manner that can be felt by a driver, where the rotational movement of the rotary switch can be blocked by a locking contour, and where the locking contour and latching contour are integrally formed on the rotary switch.

14 Claims, 5 Drawing Sheets

(58) Field of Classification Search
USPC .......................................................... 74/473.3
See application file for complete search history.

(56) References Cited

U.S. PATENT DOCUMENTS

2017/0356543 A1 12/2017 Turney et al.
2019/0211921 A1 7/2019 Watanabe et al.

FOREIGN PATENT DOCUMENTS

| DE | 10 2012 219 803 A1 | 4/2014 | |
|----|--------------------|--------|---|
| EP | 3 115 647 A2 | 1/2017 | |
| EP | 3 561 340 A1 | 10/2019 | |
| WO | WO-2018217865 A1 * | 11/2018 | ............. F16H 59/02 |

OTHER PUBLICATIONS

Office Action dated May 15, 2020 for German Patent Application No. 10 2019 213 557.9, (12 pp.), note: pp. 1 and 2 are English language Explanations to Section C. Result of Determination Document.

\* cited by examiner

SELECTOR LEVER ASSEMBLY FOR SELECTING AND SWITCHING DIFFERENT DRIVING MODES IN A VEHICLE TRANSMISSION

RELATED APPLICATIONS

This application is a filing under 35 U.S.C. § 371 of International Patent Application PCT/EP2020/073870, filed Aug. 26, 2020, and claiming priority to German Patent Application 10 2019 213 557.9, filed Sep. 6, 2019. All applications listed in this paragraph are hereby incorporated by reference in their entireties.

TECHNICAL FIELD

The present invention relates to a selector lever assembly for selecting and shifting to different driving modes in a vehicle transmission

BACKGROUND

Selector lever assemblies for selecting and shifting to different driving modes in a vehicle transmission are sufficiently known from the field of automotive engineering. The selector lever assembly normally comprises a rotary switch that is rotatably mounted in a housing, to which the driving modes are assigned over a rotational range, such that driving modes can be selected by turning the rotary switch, and can thus be shifted to. The various driving modes are normally separated by a toothed mechanism that can be felt by the driver. Furthermore, certain driving modes are blocked in certain driving situations in a manner obtained with an appropriate locking contour in the selector lever assembly.

By way of example, a shifting assembly is known from U.S. Pat. No. 9,810,314 B2 for changing gears in a vehicle transmission. Various driving modes can be selected in the vehicle transmission using a rotary switch in the shifting assembly. By way of example, the various driving modes are "park," "neutral," "reverse," "drive," and a manual driving mode, as well as a high-performance driving mode. These various driving modes can be selected using the rotary switch.

The known shifting assembly comprises a rotary knob for this, which is operated by the driver to select the various driving modes. The rotary knob is connected to a selector shaft for conjoint rotation via a splined connection, such that the rotation of the rotary knob is transferred to the selector shaft. The rotation of the selector shaft transfers the corresponding driving mode from the selector shaft in a housing to a control unit for the vehicle transmission. Furthermore, a latching disk is also connected via another splined connection to the selector shaft for conjoint rotation. The outer circumference of the latching disk has numerous teeth that interact with a latching pin to simulate a latching effect during the rotation. There is also a locking disk on the selector shaft, connected thereto for conjoint rotation. The locking disk comprises numerous recesses that corresponding locking pins can engage with, in order to be able to block the rotation of the selector shaft at specific rotational angles. The locking pins are fixed in place in the housing.

BRIEF DESCRIPTION OF THE DRAWINGS

Certain embodiments shall be explained in greater detail below in reference to the drawings. Therein.

DETAILED DESCRIPTION

Figure 1:
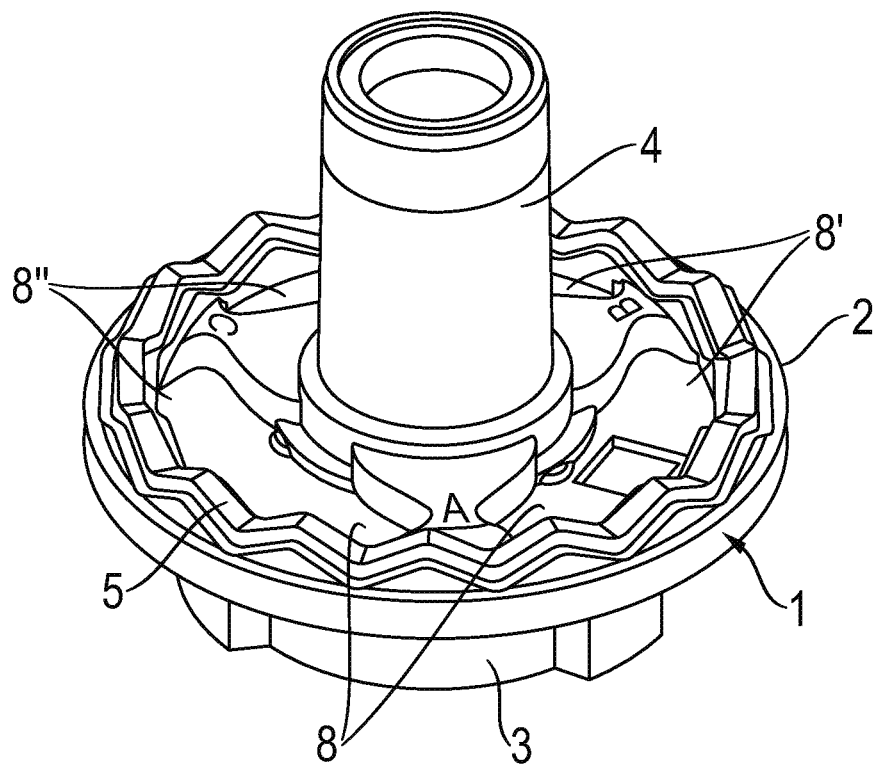
FIG. 1 shows a three dimensional schematic illustration of a first embodiment variation of a rotary switch for a selector lever assembly according to the invention.
Figure 2:
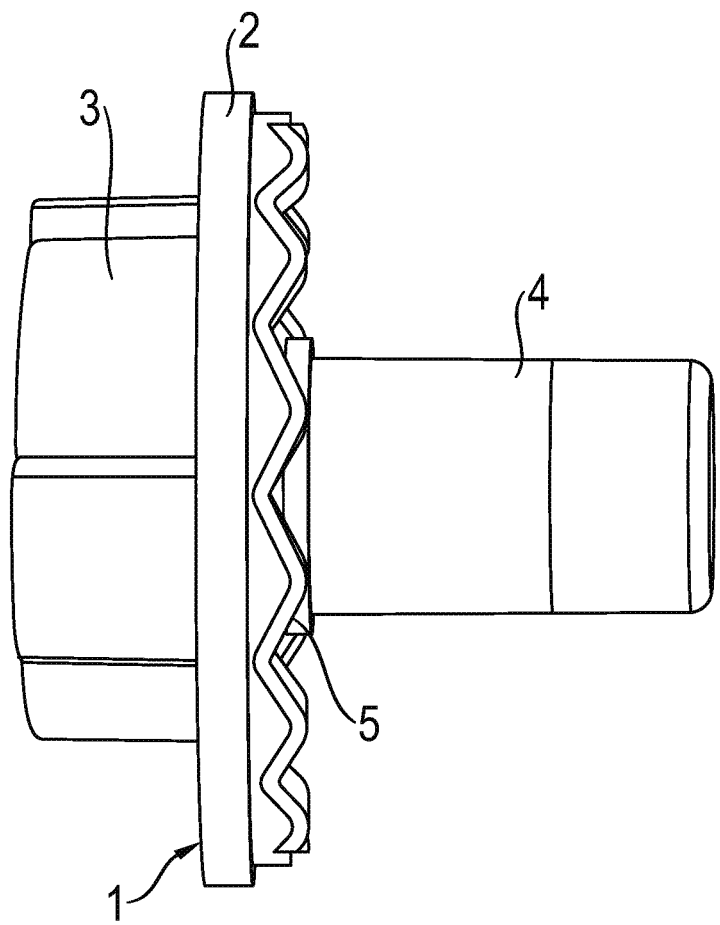
FIG. 2 shows a schematic side view of the rotary switch for the selector lever assembly.

In view of the background discussed above, an aspect of the present disclosure includes an improved selector lever assembly which has a simple construction and is inexpensive relative to known selector lever assemblies.

For example, a selector lever assembly is proposed for selecting and shifting to various driving modes, e.g. a parking setting, a reverse gear mode, a neutral mode, an automatic driving mode, a high-performance driving mode, or a manual driving mode in a vehicle transmission. The selector lever assembly comprises a rotary switch, which is rotatably mounted in a housing for this, and the driving modes are assigned to the rotational range of the rotary switch, and separated from one another by a latching contour that can be felt by a driver, and wherein the rotational movement of the rotary switch can be blocked by a locking contour. To obtain a selector lever assembly that is particularly inexpensive and contains as few components as possible, and has the simplest possible construction, the locking contour and the latching contour are integrally formed on the rotary switch.

Accordingly, in addition to the function of selecting and shifting to the various driving modes, the latching and locking functions are also integrated in a single component in the proposed selector lever assembly. This results not only in savings with regard to the production costs, but also in a significant simplification of the structural construction thereof. There is also the advantage of an optimization of the haptics as well as the mechanical play in the selector lever assembly according to the invention.

In a particularly preferred embodiment of the proposed selector lever assembly, the rotary switch forms an integral plastic injection molded component. As a result of the production through injection molding, the various functional surfaces or contours can be integrated in the plastic rotary switch in a particularly simple and inexpensive manner. Different materials can also be used, which enable a similarly optimized production of the integral rotary switch for the selector lever assembly proposed herein.

With regard to the structural design, the integral rotary switch can fundamentally assume the shape of a disk, or the like, in the framework of a further development of the invention, which contains the various shapes for implementing the various functional contours.

By way of example, the disk-shaped body can have a knob, or the like, on a first axial side, which can be manipulated by the driver. This then basically protrudes from the housing, and can be easily operated by the driver in order to select and shift to the various driving modes. A sleeve, or the like, is then formed on the opposite, second axial side of the disk-shaped body, by way of example, with which the rotary switch is rotatably mounted on the housing, such that the necessary rotations can be carried out with the rotary switch.

In order to integrate the latching and locking functions therein, a protruding annular contour can be formed on the axial side opposite the knob, which has a certain latching contour. This annular contour, which protrudes axially and is wave shaped, for example, is then used to obtain the latching feeling for the driver when turning the knob, thus separating the individual driving modes from one another. Other shapes are also conceivable, which can also be easily formed on the disk-shaped body in the proposed selector lever assembly. A protruding annular contour has the advantage, however, of resulting in a disk-shaped body that is mechanically robust.

In order to obtain the blocking function, an appropriate locking contour can be formed on the axial side of the rotary switch facing away from the knob. By way of example, the locking contour can be formed by numerous stop regions, or the like. The stop regions basically form a locking contour for locking pins in the housing, which block rotation of the rotary switch when they bear on these stop regions, such that a specific driving mode is locked in for safety reasons.

These stop regions can be formed by arbitrary geometric shapes. These stop regions, forming the locking contours, can be formed by adjacent recesses, or the like, on the disk-shaped body.

To increase the mechanical stability of the disk-shaped body, the stop regions are connected radially on the outside to the wave shaped annular contour of the latching contour, and radially on the inside to an annular region that mechanically stabilizes the disk-shaped body, or the like. In this manner, a particularly robust and inexpensive design of the rotary switch is obtained for the proposed selector lever assembly.

The number of stop regions and locking pins used in the locking contour to block the rotation of the rotary switch at specific rotational angles such that the driving mode assigned thereto is also locked in, can vary in the framework of the invention.

FIGS. 1 to 5 show various illustrations of a selector lever assembly for selecting and shifting to various driving modes in a vehicle transmission that has a rotary switch 1 that is rotatably mounted in a housing, which is not shown in detail here. The various driving modes that can be selected are assigned to the rotational range of the rotary switch 1, and are each separated from one another by a latching, or latching contour, that can be felt by the driver. The rotation of the rotary switch 1 can be blocked in certain driving situations by a locking contour.

In order to obtain a selector lever assembly with a particularly simple construction that can be produced inexpensively, the rotary switch 1 is formed with an integral locking contour and latching contour, and the rotary switch 1 is rotatably mounted in the housing.

As can be seen in FIGS. 1 to 5, the rotary switch 1 is formed by an integral plastic injection molded part. The integral rotary switch 1 has a substantially disk-shaped body 2, which can be seen in particular in the illustrations in FIGS. 1 to 3. A knob 3 for manipulation by the driver is formed on the first axial side of the rotary switch 1, which protrudes axially therefrom. A sleeve 4 is formed on the opposite, second axial side of the disk-shaped body 2 of the rotary switch 1, which protrudes axially, such that the rotary switch 1 can be rotatably mounted on the housing, on a corresponding receiver in the housing.

Figure 3:
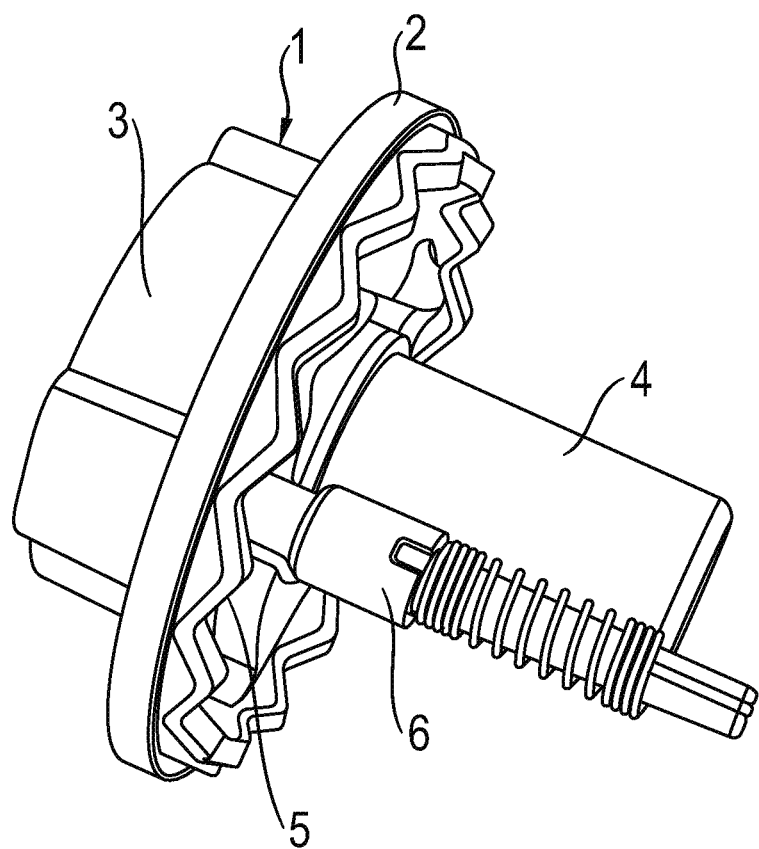
FIG. 3 shows a schematic three dimensional illustration of the rotary switch, in which a locking pin functionally interacts with a locking contour in the selector lever assembly.
Figure 4:
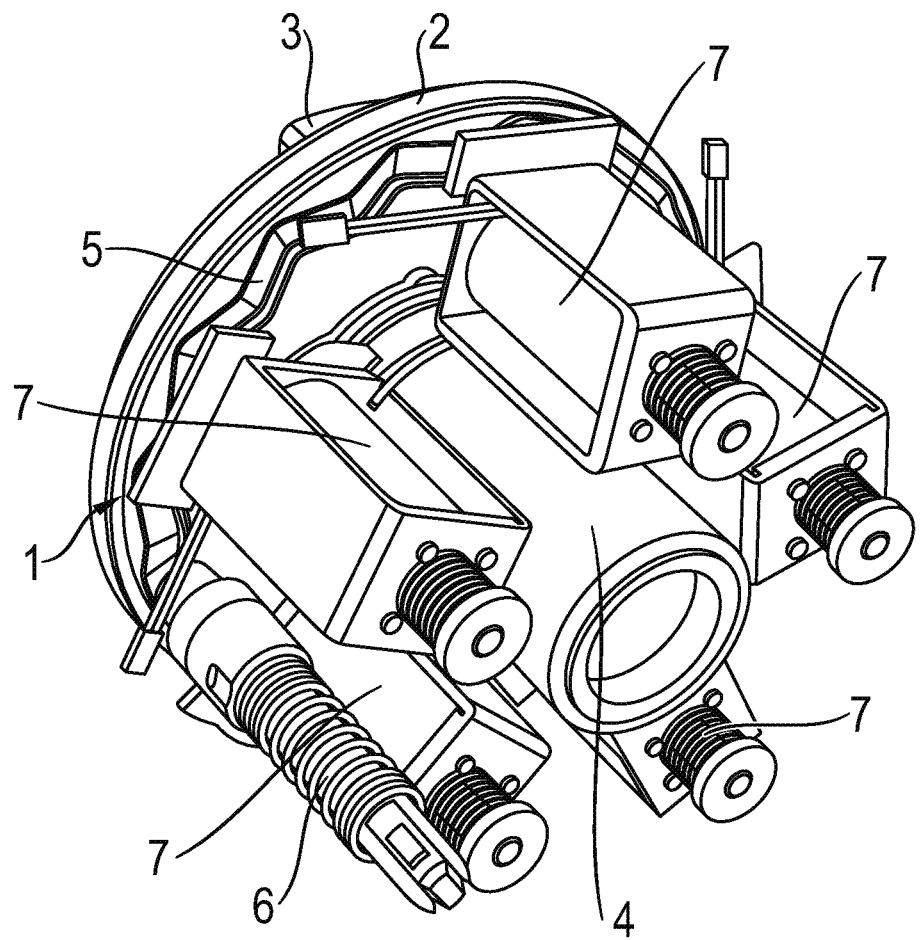
FIG. 4 shows a schematic three dimensional illustration of the rotary switch with the housing latching pin and the housing locking pins in the selector lever assembly.

The latching contour formed thereon can be seen in particular in FIGS. 3 and 4. An axially protruding wave shaped annular contour 5 is formed on the second axial side of the disk-shaped body 2 of the rotary switch 1 for this, which forms the latching contour. The wave shaped annular contour 5 interacts with a dedicated latching pin 6 in or on the housing, such that the various latching positions can be felt in a tactile manner by the driver. The spring-loaded latching pin 6, which is fixed in place in the housing, is dedicated to the wave shaped annular contour 5 that protrudes axially, such that the latching pin 6 functionally interacts with the wave shaped contour 6, and thus generates the latching effect that the driver can feel while the rotary switch 1 rotates.

There are numerous stops, or stop regions A, B, C, D on the disk-shaped body 2 that form the locking contour on the second axial side of the disk-shaped body 2 of the rotary switch 1. The stop regions A, B, C D are each formed between adjacent recesses 8, 8', 8'', 8'''. The recesses 8, 8', 8'', 8''' form ring segments on the disk-shaped body 2 in the embodiment variation shown here, such that a stop regions A, B, C, D are formed between each pair of adjacent recesses 8, 8', 8'', 8'''.

Figure 5:
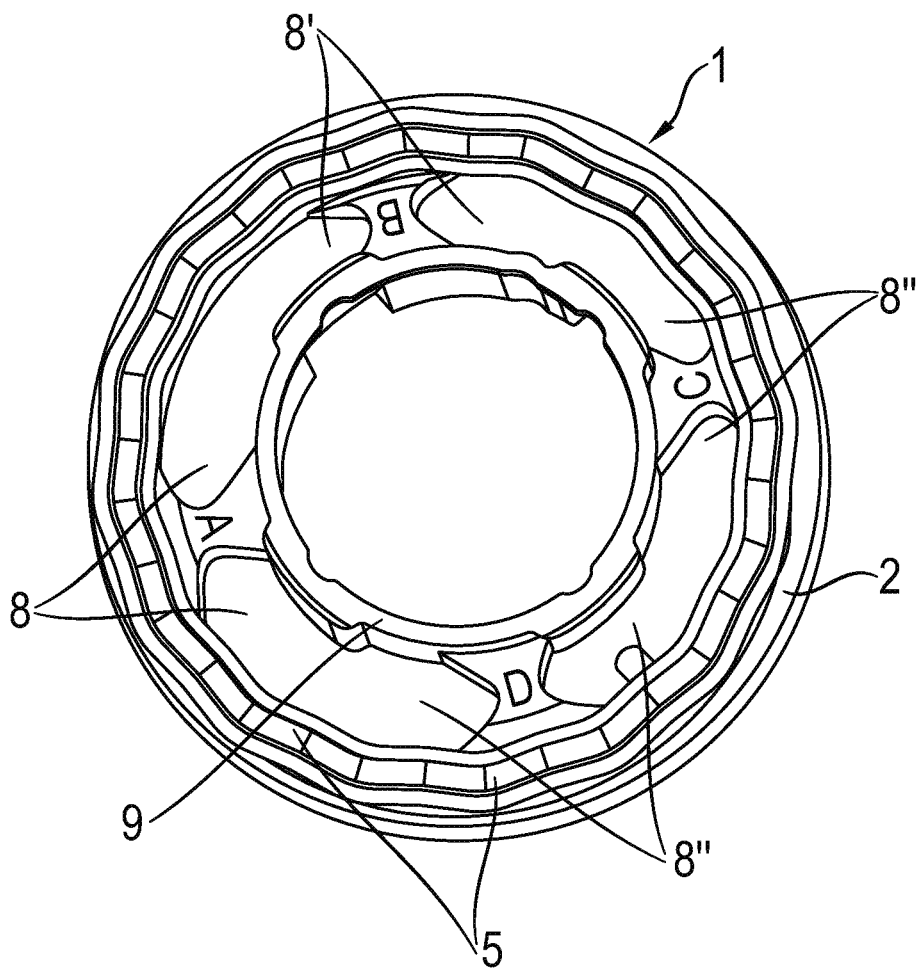
FIG. 5 shows a schematic partial illustration of a second embodiment variation of the rotary switch for the selector lever assembly according to the invention.

In the framework of a first embodiment variation, there are three stop regions A, B, C, by way of example, in FIGS. 1 to 4, while FIG. 5 shows a second embodiment variation, in which there are four stop regions A, B, C, D.

Depending on the embodiment variation, the stop regions A, B, C, D have numerous dedicated magnetically activated and axially moving locking pins 7, which can functionally interact with the respective stop regions A, B, C, D in order to block the rotation. By way of example, there are 5 locking pins 7 in FIG. 4, in the framework of the first embodiment variation, while only four locking pins are necessary in the second embodiment variation shown in FIG. 5.

The locking pins 7 are mounted on the housing such that they can move axially. They are pretensioned with a spring, and can be moved axially by a magnetic actuation, for example, such that the respective locking pin 7 comes to bear on the stop region A, B, C, D, resulting in a blocking of the rotation of the rotary switch 1 in one direction, for example. If the rotation of the rotary switch 1 is to be blocked in both directions, for example, the rotation of the rotary switch 1 is blocked in both directions in conjunction with numerous locking pins 7, which bear on various stop regions A, B, C, D, such that a specific driving mode remains locked in, even if the driver attempts to turn the rotary switch 1 by applying more force. The rotation of the rotary switch 1 is thus blocked by the activated locking pins 7 bearing on the stop regions A, B, C, D. As soon as the locking is released, the locking pins 7 are retracted axially, and therefore no longer bear on the stop regions A, B, C, D. The rotary switch 1 can then be freely rotated by the driver.

Independently of the respective embodiment variation, it can be seen in FIG. 5, for example, that each stop region A, B, C, D is connected radially on the outside to the wave shaped annular contour 5, and radially on the inside to a mechanically stabilizing annular region 9 on the disk-shaped body 2, in order to optimize the mechanical strength with a minimal use of materials.

REFERENCE SYMBOLS 1 rotary switch
2 body
3 knob
4 sleeve 5 annular contour
6 latching pin
7 locking pin
8, 8', 8", 8'" adjacent recesses
9 annular region
A, B, C, D stops, or stop regions

The invention claimed is:

1. A selector lever assembly for selecting and shifting to various driving modes in a vehicle transmission, comprising:
 a rotary switch rotatably mounted in a housing,
 wherein the driving modes are assigned along a rotational range, and separated from one another by a latching contour that can be felt by a driver; and
 a locking contour configured to selectively block a rotation of the rotary switch,
 wherein the locking contour and latching contour are integrally formed on the rotary switch,
 wherein the integral rotary switch has a disk-shaped body, which has a knob for manipulation thereof formed on a first axial side, and a sleeve formed on a second axial side, with which it can be rotatably mounted on the housing,
 wherein the latching contour has a dedicated spring-loaded latching pin fixed in place on the housing, wherein the latching pin functionally interacts with the latching contour to generate a latching effect that the driver can feel during the rotation of the rotary switch,
 wherein the locking contour is formed by a plurality of stop regions on the disk-shaped body of the rotary switch,
 wherein each stop region has an adjacent recess on the disk-shaped body of the rotary switch, and
 wherein each stop region is connected radially on an outside of the disk-shaped body to a wave-shaped annular contour and radially on an inside of the disk-shaped body to a mechanically stabilizing annular region on the disk-shaped body.

2. The selector lever assembly according to claim 1, wherein the rotary switch is configured as an integral plastic injection molded part.

3. The selector lever assembly according to claim 1, wherein the latching contour is formed on the second axial side of the disk-shaped body as the wave-shaped annular contour that protrudes axially.

4. The selector lever assembly according to claim 1, wherein the locking contour has a plurality of dedicated locking pins that are fixed in place on the housing and can move axially, which can functionally interact with the respective stop regions to block a rotational movement of the rotary switch.

5. The selector lever assembly according to claim 1, wherein the rotary switch has three stop regions forming the locking contour, with five dedicated locking pins.

6. The selector lever assembly according to claim 1, wherein the rotary switch has four stop regions forming the locking contour, with four dedicated locking pins.

7. A selector lever assembly for selecting and shifting to various driving modes in a vehicle transmission, comprising:
 a rotary switch rotatably mounted in a housing,
 wherein the driving modes are assigned along a rotational range, and separated from one another by a latching contour that can be felt by a driver; and
 a locking contour configured to selectively block a rotation of the rotary switch,
 wherein the locking contour and latching contour are integrally formed on the rotary switch,
 wherein the integral rotary switch has a disk-shaped body, which has a knob for manipulation thereof formed on a first axial side, and a sleeve formed on a second axial side, with which it can be rotatably mounted on the housing,
 wherein the latching contour has a dedicated spring-loaded latching pin fixed in place on the housing, wherein the latching pin functionally interacts with the latching contour to generate a latching effect that the driver can feel during the rotation of the rotary switch, and
 wherein the rotary switch has three stop regions forming the locking contour, with five dedicated locking pins.

8. The selector lever assembly according to claim 7, wherein the rotary switch is configured as an integral plastic injection molded part.

9. The selector lever assembly according to claim 7, wherein the latching contour is formed on the second axial side of the disk-shaped body as a wave-shaped annular contour that protrudes axially.

10. The selector lever assembly according to claim 7, wherein the locking pins can move axially, which can functionally interact with the respective stop regions to block a rotational movement of the rotary switch.

11. A selector lever assembly for selecting and shifting to various driving modes in a vehicle transmission, comprising:
 a rotary switch rotatably mounted in a housing,
 wherein the driving modes are assigned along a rotational range, and separated from one another by a latching contour that can be felt by a driver; and
 a locking contour configured to selectively block a rotation of the rotary switch,
 wherein the locking contour and latching contour are integrally formed on the rotary switch,
 wherein the integral rotary switch has a disk-shaped body, which has a knob for manipulation thereof formed on a first axial side, and a sleeve formed on a second axial side, with which it can be rotatably mounted on the housing,
 wherein the latching contour has a dedicated spring-loaded latching pin fixed in place on the housing, wherein the latching pin functionally interacts with the latching contour to generate a latching effect that the driver can feel during the rotation of the rotary switch, and
 wherein the rotary switch has four stop regions forming the locking contour, with four dedicated locking pins.

12. The selector lever assembly according to claim 11, wherein the rotary switch is configured as an integral plastic injection molded part.

13. The selector lever assembly according to claim 11, wherein the latching contour is formed on the second axial side of the disk-shaped body as a wave-shaped annular contour that protrudes axially.

14. The selector lever assembly according to claim 11, wherein the locking pins can move axially, which can functionally interact with the respective stop regions to block a rotational movement of the rotary switch.

* * * * *